United States Patent
Peng et al.

(10) Patent No.: US 9,837,005 B2
(45) Date of Patent: *Dec. 5, 2017

(54) DETECTION CIRCUIT AND METHOD FOR A LIQUID CRYSTAL DISPLAY

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhilong Peng, Beijing (CN); Xiangfei He, Beijing (CN); Wei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/974,391

(22) Filed: Dec. 18, 2015

(65) Prior Publication Data

US 2016/0104404 A1      Apr. 14, 2016

Related U.S. Application Data (63) Continuation of application No. 12/710,713, filed on Feb. 23, 2010, now Pat. No. 9,275,568.

(30) Foreign Application Priority Data

Feb. 27, 2009   (CN) .......................... 2009 1 0078645

(51) Int. Cl.
G06F 3/038     (2013.01)
G09G 3/00      (2006.01)
(Continued)

(52) U.S. Cl.
CPC .......... G09G 3/006 (2013.01); G09G 3/3406 (2013.01); G09G 3/3614 (2013.01); G06F 3/038 (2013.01);
(Continued)

(58) Field of Classification Search
CPC combination set(s) only.
See application file for complete search history.

(56) References Cited

U.S. PATENT DOCUMENTS 6,219,443 B1    4/2001  Lawrence
6,496,172 B1   12/2002  Hirakata
(Continued)

FOREIGN PATENT DOCUMENTS

JP    08-160883 A    6/1996
JP    2004-199082 A  7/2004
(Continued)

OTHER PUBLICATIONS

Japanese Office Action dated Sep. 3, 2013; Appln. No. JP2010-038636.
(Continued)

*Primary Examiner* — Jennifer Mehmood
*Assistant Examiner* — Sosina Abebe
(74) *Attorney, Agent, or Firm* — Ladas & Parry LLP (57) ABSTRACT

A detection circuit and a detection method for liquid crystal display are provided. The detection circuit comprises a gate driver for providing row scan signal to liquid crystal cell to be detected; a signal source for providing polarity inversion signal to source driver; a source driver for performing digital-analog conversion on received display data signal according to preset reference voltage and polarity inversion signal, generating pixel voltage signal, and sending pixel voltage signal to liquid crystal cell to be detected. The polarity inversion signal comprises column polarity inver-
(Continued)

sion signals each of which polarity inversion signal is continuous high level signal or continuous low level signal. The polarity inversion mode is a column inversion, which makes white dot of damaged area of alignment film is more prominent during detection process, so it would be easy for the operator to recognize it and avoid the issue of missing detection.

15 Claims, 8 Drawing Sheets

(51) Int. Cl.
  *G09G 3/36* (2006.01)
  *G09G 3/34* (2006.01)

(52) U.S. Cl.
  CPC ... *G09G 3/3648* (2013.01); *G09G 2300/0439* (2013.01); *G09G 2310/08* (2013.01); *G09G 2330/10* (2013.01)

(56) References Cited

U.S. PATENT DOCUMENTS

| | | |
|---|---|---|
| 6,680,722 B1 | 1/2004 | Hiraki et al. |
| 6,734,925 B1 | 5/2004 | Lee et al. |
| 2004/0095307 A1 | 5/2004 | Kim |
| 2007/0126975 A1 | 6/2007 | Choi et al. |
| 2009/0015574 A1 | 1/2009 | Kim et al. |
| 2009/0102769 A1 | 4/2009 | Kouno et al. |
| 2009/0310077 A1 | 12/2009 | Kim et al. |
| 2010/0149151 A1 | 6/2010 | Nam et al. |

FOREIGN PATENT DOCUMENTS

| | | |
|---|---|---|
| JP | 2004-219585 A | 8/2004 |
| JP | 2005-115375 A | 4/2005 |
| JP | 2007-079572 A | 3/2007 |
| JP | 2007-232979 A | 9/2007 |
| JP | 2008-216893 A | 9/2008 |
| JP | 2009-009088 A | 1/2009 |
| JP | 2009-044438 A | 2/2009 |
| KR | 20000032794 A | 6/2000 |
| KR | 20060133246 A | 12/2006 |

OTHER PUBLICATIONS

Japanese Notice of Rejection dated Feb. 17, 2014; Appln. No. JP2010-038636.
Japanese Examination Report dated Jul. 14, 2014; Appln. No. JP2010-038636.
USPTO NFOA dated Mar. 29, 2013 in connection with U.S. Appl. No. 12/710,713.
USPTO FOA dated Aug. 16, 2013 in connection with U.S. Appl. No. 12/710,713.
USPTO NFOA dated Dec. 19, 2013 in connection with U.S. Appl. No. 12/710,713.
USPTO FOA dated Jul. 2, 2014 in connection with U.S. Appl. No. 12/710,713.
USPTO NFOA dated Oct. 6, 2014 in connection with U.S. Appl. No. 12/710,713.
USPTO FOA dated Apr. 23, 2015 in connection with U.S. Appl. No. 12/710,713.
USPTO NOA dated Sep. 3, 2015 in connection with U.S. Appl. No. 12/710,713.
USPTO NOA dated Dec. 18, 2015 in connection with U.S. Appl. No. 12/710,713.
Japanese Office Action Appln. No. 2014-23167; Dated Nov. 17, 2015.
Japanese Office Action dated Aug. 8, 2016; Appln. No. 2014-231671.

Fig.8 row inversion mode​ ​ ​ ​ ​ ​ ​ ​ column inversion mode

DETECTION CIRCUIT AND METHOD FOR A LIQUID CRYSTAL DISPLAY

The present application is a continuation application of U.S. Ser. No. 12/710,713 filed on Feb. 23, 2010 to USPTO.

BACKGROUND

The embodiments of present invention relate to a detection circuit and a detection method for a liquid crystal display.

DISCUSSION OF THE BACKGROUND

Figure 1:
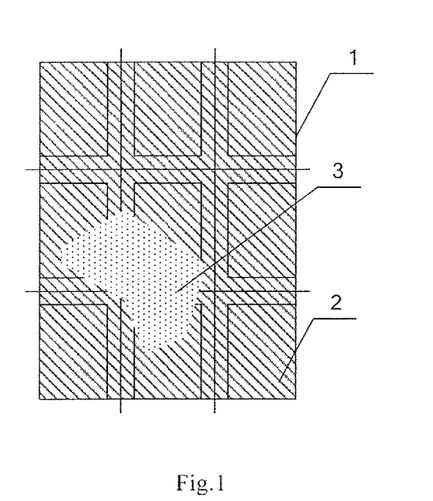
FIG. 1 is an illustrative diagram of the alignment film formed after the rubbing process.

In the structure of a liquid crystal display, an alignment film may control liquid crystal molecules to produce optical rotation, wherein its orientation angle and pre-tilt angle are critical conditions enabling the liquid crystal molecules to produce optical rotation. The manufacture procedure of the alignment film includes the processes of coating and rubbing alignment film, bubbles generated in coating process and broken after rubbing process and rubbing scratches caused by particles and foreign matters and so on during the rubbing process would cause the alignment film being partially damaged, as illustrated in FIG. 1. FIG. 1 is an illustrative diagram of the alignment film formed after the rubbing process, alignment film 2 is formed on a pixel area 1 of a substrate in FIG. 1. The pixel area 1 comprises 9 sub-pixels, alignment film damage 3 occurs on the alignment film of some of sub-pixels in the pixel area 1. In case of damage to the alignment film, the normal orientation angle and pre-tilt angle of the alignment film no longer exist, which causes turbulence to the liquid crystal molecules, so that the liquid crystal molecules could not produce optical rotation effect controlled by the voltage on both ends of the pixels electrode as in the normal situation, thus resulting in the light leaking phenomenon, which would cause abnormal display in the damaged area of the alignment film, and white dot occurs.

Figure 2:
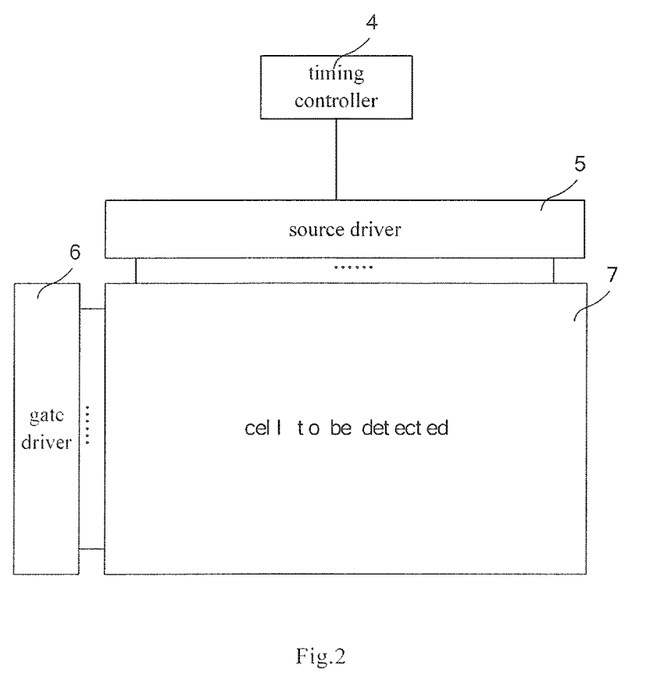
FIG. 2 is an illustrative diagram of the structure of a circuit for detecting cell in the prior art.
Figure 3:
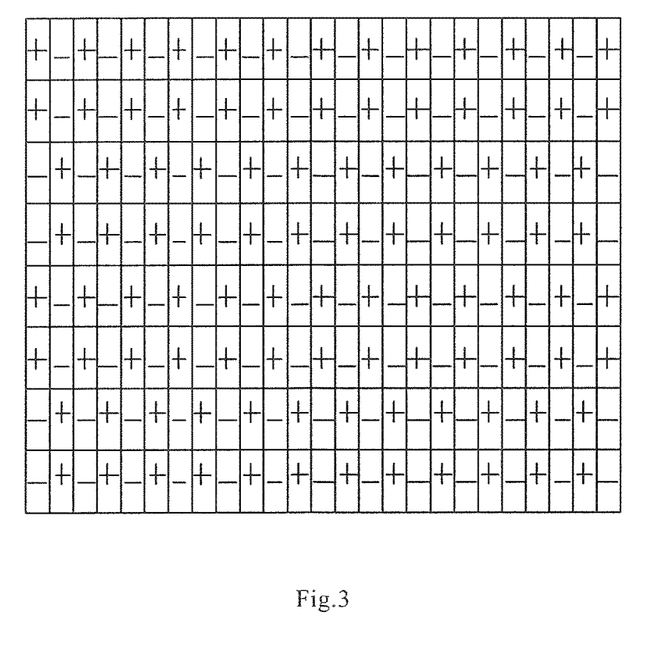
FIG. 3 is an illustrative diagram of a two rows inversion mode in the prior art.
Figure 4:
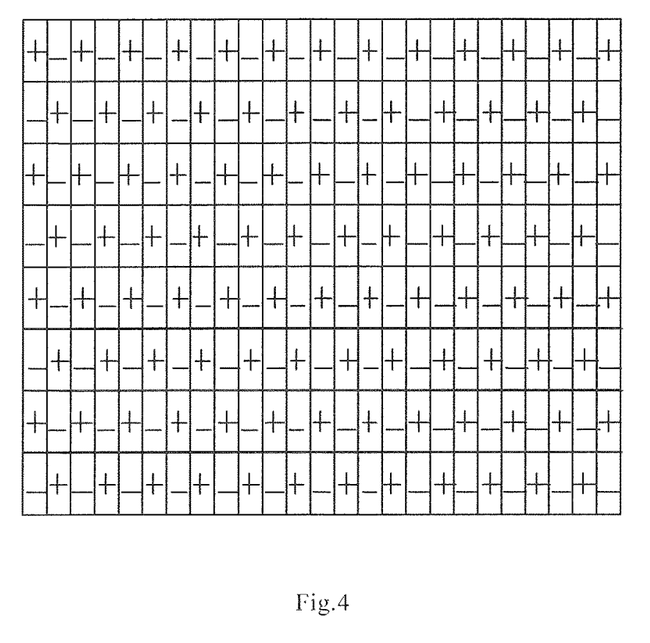
FIG. 4 is an illustrative diagram of a single row inversion mode in the prior art.
Figure 5:
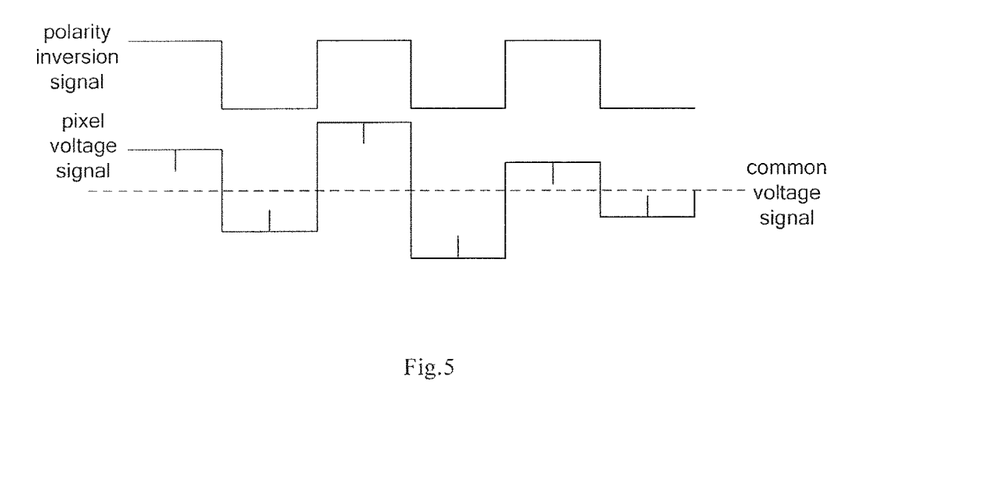
FIG. 5 is an illustrative diagram of wave of an input polarity inversion signal vs. the wave of an output pixel voltage signal.

As to the detection of the white dot in the damaged area of the alignment film, it is generally achieved through the detection for the liquid crystal cell after the cell assembly process, as illustrated in FIG. 2. FIG. 2 is an illustrative diagram of the structure of a circuit for detecting cell in the prior art. Said circuit includes a timing controller 4, a source driver 5 and a gate driver 6. The timing controller 4, as a core component for a display drive, usually is user customized chip, which could output various signals to the source driver 5, such as a frame ON signal, a column clock pulse signal and a polarity inversion signal. The polarity inversion signal could act as a role of preventing liquid crystal molecules from aging and reducing crosstalk interference of the signals between the adjacent pixels in display driving. The timing controller 4 outputs the polarity inversion signal to the source driver 5, the display data signal to be displayed in the cell 7 to be detected also enters into source driver 5, which performs the digital-analogue conversion on the display data signal according to the preset reference voltage and polarity inversion signal, generates pixel voltage signal and outputs the pixel voltage signal to the cell 7 to be detected, and it would be under the control of the row scan signal output by gate driver 6 in outputting the pixel voltage signal to the cell 7 to be detected, the pixel electrode of each pixel in the cell 7 to be detected receives a pixel voltage signal generated by source driver 5 according to polarity inversion signal and display data signal. In particular, polarity inversion signal could control the polarity of the pixel voltage signal, thus the cell 7 to be detected forms different polarity inversion modes, such as two rows inversion mode and single row inversion mode, and so on. FIG. 3 is an illustrative diagram of the two rows inversion mode in the prior art, and FIG. 4 is an illustrative diagram of the single row inversion mode in the prior art. As illustrated in FIG. 3 and FIG. 4, the row inversion mode shown in FIG. 3 is two rows inversion mode, namely, the pixel voltage signal received by the cell to be detected is a signal whose polarity changes once every other two rows; the row inversion mode shown in FIG. 4 is single row inversion mode, namely, the pixel voltage signal received by the cell to be detected is a signal whose polarity changes once every other one row; meanwhile, because the polarity of each pixel shown in FIG. 4 is contrary to the polarity of the adjacent pixel thereof, in this situation, the polarity inversion mode shown in FIG. 4 can also be referred to as dot inversion mode. Reference could be made to FIG. 5 with respect to the control to the polarity of pixel voltage signal by the polarity inversion signal. FIG. 5 is an illustrative diagram of wave of the input polarity inversion signal vs. the wave of the output pixel voltage signal, wherein, the polarity inversion signal is a periodical square wave signal, which could control the polarity of pixel voltage signal, so as to form the two rows inversion mode of FIG. 3. When the input polarity inversion signal is a signal with a high level, the output is pixel voltage signal with positive polarity, i.e., pixel voltage signal having a voltage value higher than the common electrode signal; when the input polarity inversion signal is a signal with a low level, the output is pixel voltage signal with negative polarity, i.e., pixel voltage signal having a voltage value lower than the common electrode signal.

However, because the damage to the alignment film normally happens in a very small area, such as in the area of the 9 sub-pixel shown in FIG. 1, and there are glutinosity effect or crosstalk interference of the signals between liquid crystal molecules in said area and liquid crystal molecules of the surrounding normal areas, and the selectivities to the light through the upper and lower polarization sheets (the polarization directions are orthogonal), there is a problem that it is difficult to discriminate the display effects of the damaged area of the alignment film and the normal area, for example, it is difficult to discriminate the display effects of the damaged area and the normal area under the above described two rows polarity inversion mode and single row polarity inversion mode. Therefore, in the detection process, it is difficult for the operator to recognize the white dot of the damaged area of alignment film, and missing detection easily occurs.

SUMMARY

The embodiments of present invention aim to address the problems of the prior art, provide a detection circuit and a detection method for the liquid crystal display, therefore resolves the problem in the prior art that it is difficult for the operator to recognize a white dot of the damaged area of alignment film and easily resulting the issue of missing detection.

To achieve said aim, the embodiments of present invention provide a detection circuit for a liquid crystal display, comprising a gate driver, a signal source, and a source driver, wherein the gate driver provides a row scan signal to a liquid crystal cell to be detected;

the signal source provides a polarity inversion signal to the source driver, and the polarity inversion signal comprises a continuous high level signal and a continuous low level signal; and the source driver performs a digital-analogue conversion on received display data signal according to a preset reference voltage and the polarity inversion signal, generates a pixel voltage signal, and sends the pixel voltage signal to the liquid crystal cell to be detected, and a polarity inversion mode generated by the pixel voltage signal is a column inversion mode.

To achieve said aim, the embodiments of present invention provide a detection method of a liquid crystal display, comprising:

providing a polarity inversion signal to a source driver by a signal source, wherein the polarity inversion signal comprises a continuous high level signal and a continuous low level signal;

performing a digital-analogue conversion by the source driver on received display data signal according to a preset reference voltage and the polarity inversion signal so as to generate a pixel voltage signal; and providing a row scan signal by a gate driver to a liquid crystal cell to be detected, wherein under the control of said row scan signal, the source driver sends the pixel voltage signal to the liquid crystal cell to be detected so as to load a gray picture to the liquid crystal cell to be detected, and polarity inversion mode formed by the pixel voltage signal is a column inversion mode.

To achieve said aim, the embodiments of present invention provide a detection method of liquid crystal display, comprising steps of:

201, providing a polarity inversion signal from a timing controller to a source driver, wherein the polarity inversion signal is a periodical square wave signal;

202, performing a digital-analogue conversion by a source driver on received display data signal according to a preset reference voltage and the polarity inversion signal provided from the timing controller, so as to generate a pixel voltage signal;

203, providing a row scan signal from a gate driver to a liquid crystal cell to be detected, wherein under the control of said row scan signal, the source driver sends the generated pixel voltage signal to the liquid crystal cell to be detected, so as to load a gray picture to the liquid crystal cell to be detected;

204, connecting the signal source and the source driver under control of a control switch;

205, providing a polarity inversion signal from the signal source to the source driver, wherein the polarity inversion signal includes a continuous high level signal and a continuous low level signal;

206, performing a digital-analogue conversion by the source driver on the received display data signal according to the preset reference voltage and the polarity inversion signal provided from the signal source so as to generate a pixel voltage signal;

207, providing a row scan signal from the gate driver to the liquid crystal cell to be detected, and sending the pixel voltage signal from the source driver to the liquid crystal cell to be detected, so as to load a gray picture to the liquid crystal cell to be detected; and 208, determining whether there is white dot in the liquid crystal cell to be detected based on whether a prominent bright area exists in the gray picture.

The pixel voltage signal is generated by the continuous high level signal and continuous low level signal of the signal source in the technical solution of the present invention, and said pixel voltage signal could form a polarity inversion mode of column inversion, when compared with the polarity inversion mode of row inversion in the prior art, the embodiments of present invention change the mutual affection and crosstalk interference of the signals between neighboring liquid crystal molecules, such that the white dot of the damaged area of alignment film is more prominent during the detection process, so it would be easy for the operator to recognize it and thus avoid the issue of missing detection.

Further, the technical solutions of the present invention will be described in details through the accompanying drawings and embodiments.

DETAILED DESCRIPTION OF THE EMBODIMENTS

Figure 6:
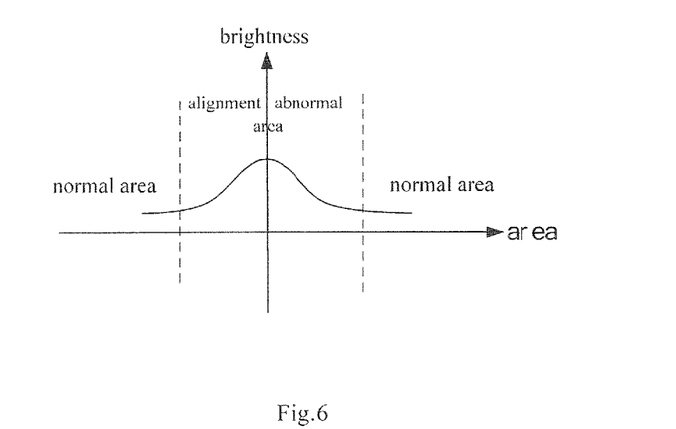
FIG. 6 is a diagram of luminance distribution in a damaged area of the alignment film.

It was shown from the analysis result that a normal pixel is controlled by voltages applied on the pixel electrode and has a normal display effect, while the pixel in the damaged area of alignment film is not totally free of the control of the voltage applied on the pixel electrode, but its controlled status is different from that of the normal pixel, and is mainly under control of the mutual affection and crosstalk interference of the signals of the surrounding liquid crystal molecules. From the analysis on the display effect of the damaged area of alignment film, it can be understood that the luminance of the damaged area of alignment film is higher than that of normal area, and the luminance distribution of the damaged area of alignment film presents the feature of being high in the centre while being low in the peripheral area, that is, the luminance at the white dot is higher than the luminance of the normal area, as illustrated in FIG. 6, which is the diagram of luminance distribution in the damaged area of the alignment film.

According to the above analysis result, the detection circuit of embodiment of the present invention is to change the polarity inversion mode through changing the polarity inversion signal, so as to realize the changing of the mutual affection and crosstalk interference of the signals between liquid crystal molecules. In this way, the display for the white dot in the damaged area of alignment film would be more prominent during the detection process, such that it would be easy for the operator to recognize it and thus avoid the issue of missing detection.

Figure 7:
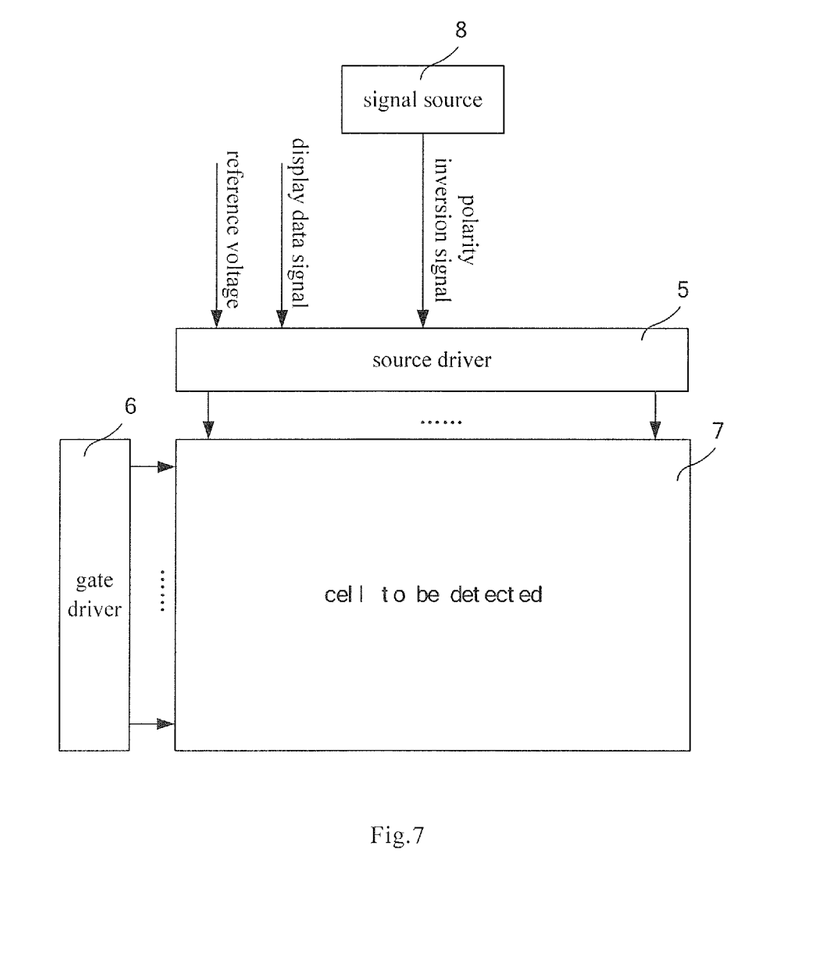
FIG. 7 is an illustrative diagram of the structure of a detection circuit for a liquid crystal display according to a first embodiment of the present invention.

FIG. 7 is an illustrative diagram of the structure of a detection circuit for a liquid crystal display according to a first embodiment of the present invention. Referring to FIG. 7, said detection circuit includes a source driver 5, a gate driver 6 and a signal source 8. In order to describe the technical solution of the present embodiment more clearly, FIG. 7 also shows a cell 7 to be detected that is connected to the detection circuit. The gate driver 6 provides a row scan signal to the cell 7 to be detected; the signal source 8 provides a polarity inversion signal to the source driver 5, the polarity inversion signal includes a continuous high level signal and a continuous low level signal; the source driver 5 performs a digital-analogue conversion on the received display data signal according to a preset reference voltage and the polarity inversion signal, generates a pixel voltage signal, and sends the pixel voltage signal to the cell 7 to be detected, wherein the polarity inversion mode formed by the pixel voltage signal is a column inversion mode.

The reference voltage could be preset according to the type of the cell 7 to be detected, and different type of the cell 7 to be detected could be set with different reference voltage. The display data signal is a signal required to be displayed in the cell 7 to be detected. The display data signal is used to display a gray picture for detection on the cell 7 to be detected, in particular, when the source driver 5 sends the pixel voltage signal generated after performing the digital-analogue conversion on the display data signal to the cell 7 to be detected, a gray picture is displayed on the cell 7 to be detected. The pixel voltage signals comprise pixel voltage signals with positive polarity and pixel voltage signals with negative polarity. Each pixel electrode on the cell 7 to be detected corresponds to one pixel voltage signal.

Figure 8:
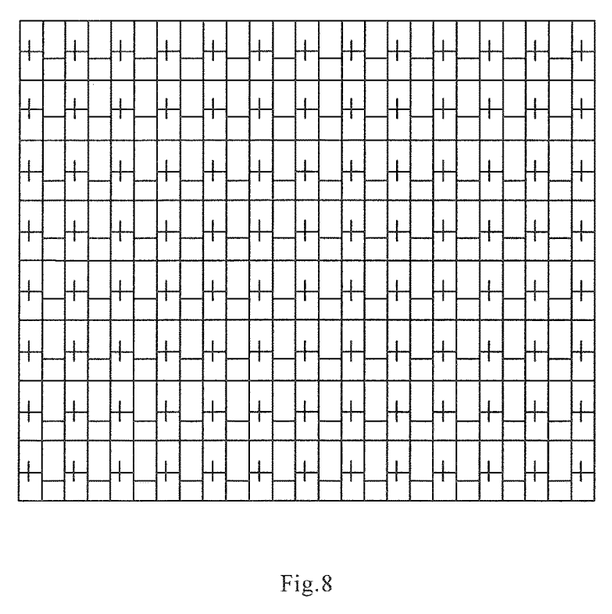
FIG. 8 is an illustrative diagram of a single column inversion mode.

The detection circuit of embodiment of the present embodiment could be used to detect the white dot in the liquid crystal display caused by the damaged alignment film. When it is required to perform the white dot detection, the signal source 8 provides a polarity inversion signal to the source driver 5, the polarity inversion signal includes a continuous high level signal and a continuous low level signal, and for the pixel of the cell 7 to be detected, the polarity inversion signals corresponding to the neighboring two column pixels are different. For example, a pixel voltage signal for one column pixel is a continuous high level signal, while the pixel voltage signal for another column pixel adjacent to said column pixel is a continuous low level signal. The source driver 5 performs a digital-analogue conversion on the received display data signal according to a preset reference voltage and the polarity inversion signal provided by the signal source 8, so as to generate a pixel voltage signal. When the polarity inversion signal is a continuous high level signal, the generated pixel voltage signal is a pixel voltage signal with positive polarity, namely, a voltage signal above the common electrode signal. When the polarity inversion signal is a continuous low level signal, the generated pixel voltage signal is a pixel voltage signal with negative polarity, namely, a voltage signal below the common electrode signal. The gate driver 6 provides a row scan signal to the cell 7 to be detected, in particular, the gate driver 6 provides a row scan signal to the cell 7 to be detected on a row by row basis. As for pixels of a certain row in the cell 7 to be detected, the gate driver 6 provides a row scan signal to the pixels of said row. When the row scan signal reaches the gate of the pixel, the channel is turned on, the source driver 5 sends the pixel voltage signal corresponding to each pixel of said row to the pixel electrode of the pixel, the pixel voltage signals received by the two neighboring pixel electrode are different, for example, one pixel receives a pixel voltage signal with positive polarity, while another pixel receives a pixel voltage signal with negative polarity. Therefore the polarity inversion mode of the pixel in the cell 7 to be detected is a column inversion mode, in particular, said column inversion mode is a single column inversion mode, as illustrated in FIG. 8, which is an illustrative diagram of the single column inversion mode of embodiment of the present invention. In FIG. 8, the polarity change of the pixel voltage signal occurs once every other column for the pixel of the cell 7 to be detected, thereby it is referred to as single column inversion mode.

Figure 9:
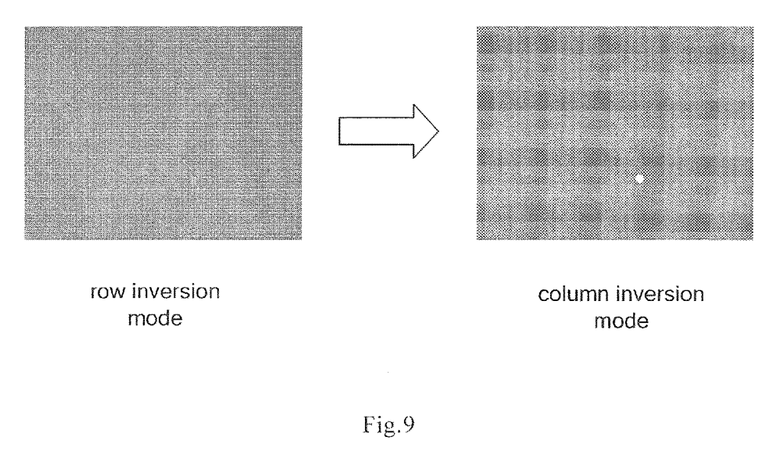
FIG. 9 is a diagram showing the display effect of the white dot of the single column inversion mode vs. that of row inversion mode in the prior art.

When detecting the cell 7 to be detected using aforementioned detection circuit, and when there is a prominent bright area on the gray picture displayed by the cell 7 to be detected, it is determined that the bright area is a white dot; when there is no prominent bright area on the gray picture displayed by the cell 7 to be detected, it is determined that no white dot exists. When the signal source 8 provides a polarity inversion signal including a continuous high level signal and a continuous low level signal to source driver 5, the polarity inversion mode in the cell 7 to be detected is the single column inversion mode of FIG. 8. As compared with row inversion mode of prior art in FIGS. 3 and 4, the column inversion mode of the present embodiment changes the mutual affection and crosstalk interference of the signals of liquid crystal molecules of neighboring pixels, such that the white dot of the damaged area of alignment film is more prominent, as illustrated in FIG. 9, which is a diagram showing the display effect of the white dot of the single column inversion mode of embodiment of the present invention vs. that of row inversion mode in the prior art. As shown from FIG. 9, when using the single column inversion mode of embodiment of the present invention, the displayed white dot is more prominent than that of the row inversion mode in the prior art.

Figure 10:
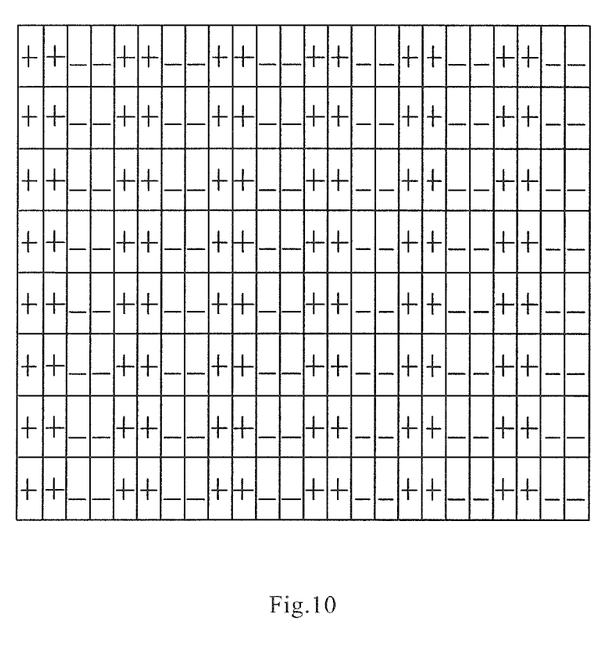
FIG. 10 is an illustrative diagram of the two columns inversion mode.

In addition, the column inversion mode of embodiment of the present invention also could be a two columns inversion mode, as illustrated in FIG. 10, which is an illustrative diagram of the two columns inversion mode of embodiment of the present invention, the polarity change of the pixel voltage signal occurs once every other two columns for the pixel of cell 7 to be detected in FIG. 10, thereby it is referred to as the two columns inversion mode. By comparing said inversion mode with the row inversion mode in the prior art, the displayed white dot thereof is also more prominent.

The pixel voltage signal is generated by the continuous high level signal and the continuous low level signal of the signal source in the detection circuit of the present embodiment, and said pixel voltage signal could form a polarity inversion mode of column inversion. As compared with the polarity inversion mode of row inversion in the prior art, the present embodiment changes the mutual affection and crosstalk interference of the signals of neighboring liquid crystal molecules, such that the white dot of the damaged area of alignment film is more prominent during the detection process, so it would be easy for the operator to recognize it and avoid the issue of missing detection.

Figure 11:
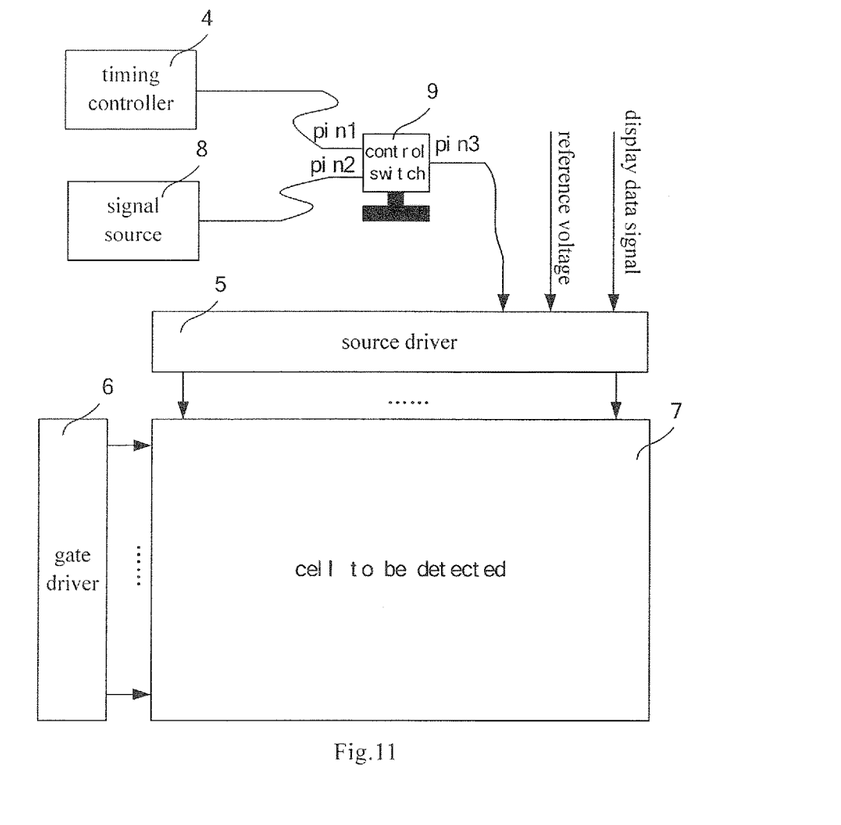
FIG. 11 is an illustrative diagram of the structure of a detection circuit for a liquid crystal display according to a second embodiment of the present invention.

FIG. 11 is an illustrative diagram of the structure of a detection circuit for the liquid crystal display according to a second embodiment of the present invention. As illustrated in FIG. 11, the present embodiment can further include a timing controller 4 and a control switch 9 on the basis of the first embodiment. The control switch 9 is connected to the timing controller 4, the signal source 8 and the source driver 5, the control switch 9 is used to control the connection between the signal source 8 and the source driver 5 or to control the connection between the timing controller 4 and the source driver 5. In particular, the control switch 9 is a multiple-way selection switch, when the detection circuit need to perform the white dot detection, the control switch 9 controls the pin 2 and pin 3 to be connected so as to enable the signal source 8 and the source driver 5 to be connected, the signal source 8 could output polarity inversion signal to the source driver 5 through the control switch 9; when the detection circuit need to perform a detection for other items, the control switch 9 controls the pin 1 and pin 3 to be connected, so as to enable the timing controller 4 and the source driver 5 to be connected, the timing controller 4 could output various signal to the source driver 5 through the control switch 9. The description of function of each module of the detection circuit and the detection process when performing the white dot detection could make reference to the first embodiment; the details are not repeated herein.

The control switch 9 of FIG. 11 is a multiple-way selection switch, with main function is described as follows. When the switch is not depressed, its pin 1 and pin 3 are connected, while the switch is depressed, the pin 2 and pin 3 are connected. Typically, the pin 1 and pin 3 of the control switch 9 are connected, that means the timing controller 4 and the source driver 5 are connected, the detection circuit could perform the detection for various items; when the detection circuit need to perform the white dot detection on the cell 7 to be detected, the control switch 9 is depressed, thus it enables the signal source 8 and the source driver 5 to be connected. At this time, the white dot detection for the cell 7 to be detected could be carried out by utilizing the polarity inversion signal output by the signal source 8.

The process of performing white dot detection for the cell 7 to be detected could be illustrated as follows. The source driver 5 performs the digital-analogue conversion on the received display data signal according to a reference voltage and the polarity inversion signal output by the timing controller 4, so as to generate a pixel voltage signal, and sends the generated pixel voltage signal to the cell 7 to be detected, thereby a gray picture is loaded to the cell 7 to be detected. For example, the level of the gray picture could be from 60 through 100; the operator depresses the control switch 9, at this time, the signal source 8 and the source driver 5 are connected, the signal source 8 outputs a polarity inversion signal including a continuous high level signal and a continuous low level signal to the source driver 5, the source driver 5 newly performs the digital-analogue conversion on the display data signal according to the reference voltage and the polarity inversion signal output by the signal source 8, so as to generate a pixel voltage signal, and sends the newly generated pixel voltage signal to the cell 7 to be detected, thereby a gray picture is newly loaded to the cell 7 to be detected. At this time, the polarity inversion mode of the pixel of the cell 7 to be detected is a column inversion mode; the operator looks at the gray picture. If there is a prominent bright area, then it is determined that said prominent bright area is a white dot, otherwise, it is determined that there is no white dot on the cell 7 to be detected. If there is a damage area of alignment film in the cell 7 to be detected, then the white dot of the gray picture newly loaded based on the polarity inversion signal output by the signal source 8 would be more prominent.

The present embodiment makes a simple improvement on the basis of the detection circuit of the prior art, wherein the signal source and the control switch are added thereto. When the detection circuit does not need to perform the white dot detection, the timing controller and the source driver are connected. At this time, the detection circuit can be used to perform the detection for other items. When the detection circuit needs to perform the white dot detection, the signal source and the source driver are connected. At this time, the detection circuit can perform the white dot detection. The detection circuit of the present embodiment can be used for the white dot detection of cell 7 to be detected and the detection of other items at the same time, when performing the white dot detection, it is only required to depress the control switch, thus making operation easy. It can achieve a very good effect when being applied to detection in a large scale.

The pixel voltage signal is generated from the continuous high level signal and the continuous low level signal of the signal source in the detection circuit of the present embodiment, and said pixel voltage signal could form a polarity inversion mode of column inversion. As compared with the polarity inversion mode of row inversion in the prior art, the present embodiment changes the mutual affection and crosstalk interference of the signals of neighboring liquid crystal molecules, such that the white dot of the damaged area of alignment film is more prominent during the detection process, so it would be easy for the operator to recognize it and avoid the issue of missing detection.

Figure 12:
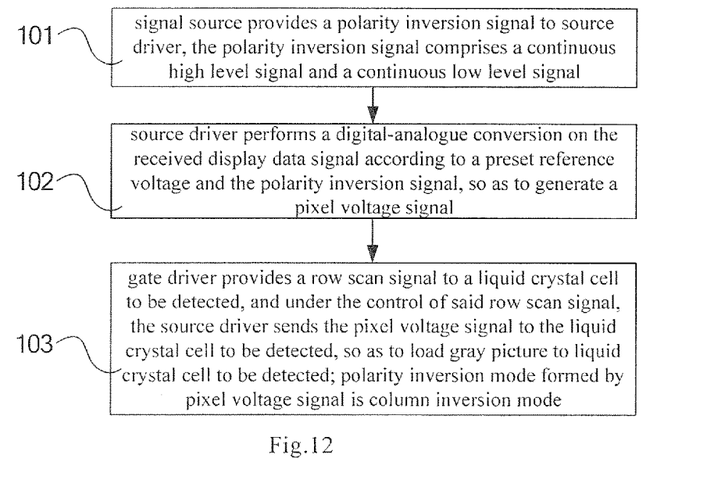
FIG. 12 is a flowchart of a detection method for a liquid crystal display according to a first embodiment of the present invention.

FIG. 12 is a flowchart of a detection method for a liquid crystal display according to a first embodiment of the present invention, as illustrated in FIG. 12, the detection method of the present embodiment can be based on the detection circuit of FIG. 7, and particularly, the detection method comprises the following steps.

step 101, the signal source provides a polarity inversion signal to the source driver, the polarity inversion signal includes a continuous high level signal and a continuous low level signal.

step 102, the source driver performs a digital-analogue conversion on the received display data signal according to a preset reference voltage and the polarity inversion signal, so as to generate a pixel voltage signal.

step 103, the gate driver provides a row scan signal to the liquid crystal cell to be detected and the source driver sends the pixel voltage signal to the liquid crystal cell to be detected, so as to load a gray picture to the liquid crystal cell to be detected, wherein the polarity inversion mode formed by the pixel voltage signal is a column inversion mode.

The pixel voltage signal is generated by the continuous high level signal and the continuous low level signal of the signal source in the detection method of the present embodiment, and said pixel voltage signal could form a polarity inversion mode of column inversion, when compared with the polarity inversion mode of row inversion in the prior art, the present embodiment changes the mutual affection and crosstalk interference of the signals of neighboring liquid crystal molecules, such that the white dot of the damaged area of alignment film in the gray picture is more prominent during the detection process, so it would be easy for the operator to recognize the white dot and avoid the issue of missing detection.

Figure 13:
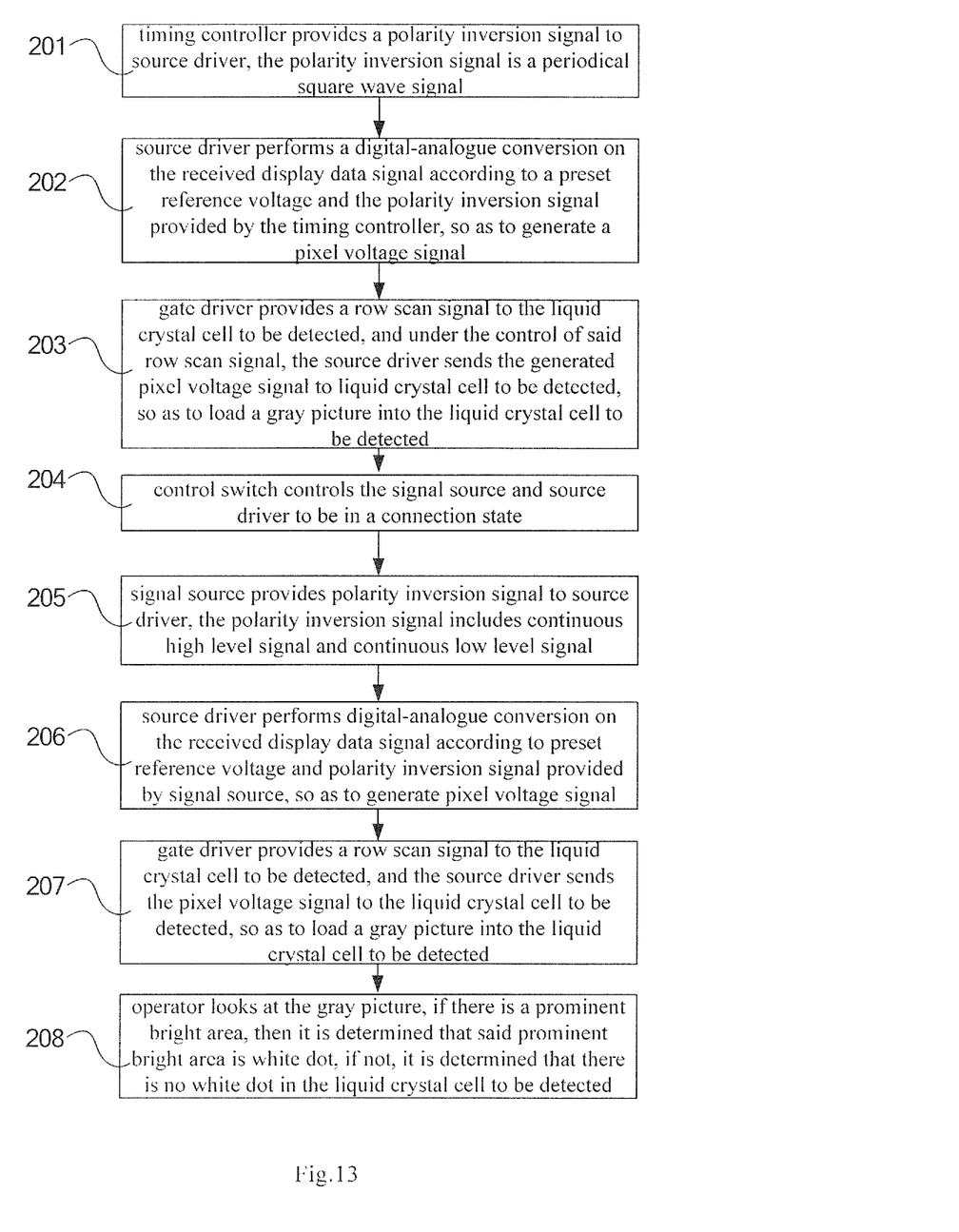
FIG. 13 is a flowchart of a detection method for a liquid crystal display according to a second embodiment of the present invention.

FIG. 13 is a flowchart of a detection method for the liquid crystal display according to a second embodiment of the present invention, as illustrate in FIG. 13, the detection method of the present embodiment can be based on the detection circuit of FIG. 11, as illustrate in FIG. 13, and particularly, the detection method comprises:

step 201, timing controller provides a polarity inversion signal to the source driver, the polarity inversion signal is a periodical square wave signal. At this time, the control switch is not depressed, the timing controller and the source driver are in a connection state.

Step 202, the source driver performs a digital-analogue conversion on the received display data signal according to a preset reference voltage and the polarity inversion signal provided by the timing controller, so as to generate a pixel voltage signal.

Step 203, gate driver provides a row scan signal to the liquid crystal cell to be detected, and under the control of said row scan signal, the source driver sends the generated pixel voltage signal to liquid crystal cell to be detected, so as to load a gray picture into the liquid crystal cell to be detected.

In present embodiment, the level of the loaded gray picture can be from 60 to 100; the polarity inversion mode formed by the pixel voltage signal in this step could be a row inversion mode or a dot inversion mode.

Step 204, control switch controls the signal source and source driver to be in a connection state.

After the control switch is depressed, the timing controller and the source driver are disconnected, while the signal source and the source driver are connected.

Step 205, the signal source provides a polarity inversion signal to the source driver, and the polarity inversion signal includes continuous high level signal and continuous low level signal.

Step 206, the source driver performs a digital-analogue conversion on the received display data signal according to a preset reference voltage and the polarity inversion signal provided by the signal source, so as to generate a pixel voltage signal.

Step 207, the gate driver provides a row scan signal to the liquid crystal cell to be detected, and the source driver sends the pixel voltage signal to the liquid crystal cell to be detected, so as to load a gray picture into the liquid crystal cell to be detected.

The polarity inversion mode formed by the pixel voltage signal is a column inversion mode, in particular, it can be a single column inversion mode or a two columns inversion mode. The level of the loaded gray picture can be from 60 to 100.

Step 208, the operator looks at the gray picture, if there is a prominent bright area, then it is determined that said prominent bright area is a white dot, if there is no prominent bright area, it is determined that there is no white dot in the liquid crystal cell to be detected.

If there is a damage area of alignment film in the liquid crystal cell to be detected, the white dot of the gray picture newly loaded based on the polarity inversion signal output by the signal source would be more prominent.

The pixel voltage signal is generated by the continuous high level signal and the continuous low level signal of the signal source in the detection method of the present embodiment, and said pixel voltage signal could form a polarity inversion mode of column inversion, when compared with the polarity inversion mode of row inversion in the prior art, the present embodiment changes the mutual affection and crosstalk interference of the signals of neighboring liquid crystal molecules, such that the white dot of the damaged area of alignment film in the gray picture, formed during the detection process, is more prominent, so it would be easy for the operator to recognize the white dot and avoid the issue of missing detection.

Finally, it should be noted that, the above embodiments are used only to explain the technical solution of the present invention, not to limit the invention, although the present invention has been described in details with reference to the preferred embodiments thereof, it would be obvious to those skilled in the art that he can still make variations or equal replacement to the technical solution of the present invention, such variations or equal replacement are not to be regarded as a departure from the spirit and scope of the invention.

What is claimed is:

1. A detection circuit for detecting a damaged area of an orientation film in a liquid crystal display, comprising a signal source, a gate driver, and a source driver,
   wherein the signal source provides a polarity inversion signal to the source driver, and the polarity inversion signal comprises column polarity inversion signals each of which defines a polarity of pixel voltage signal for at least one column of pixels of the liquid crystal panel and is a continuous high level signal or a continuous low level signal;
   the gate driver provides a row scan signal to a liquid crystal panel to be detected; and
   the source driver performs a digital-analogue conversion on received display data signal according to a preset reference voltage and the polarity inversion signal, generates a pixel voltage signal, and sends the pixel voltage signal to the liquid crystal panel to be detected, so as to load a gray picture to the liquid crystal panel to be detected and determine whether there is the damaged area of the orientation film in the liquid crystal panel to be detected based on whether a prominent bright area exists in the gray picture loaded in the liquid crystal panel to be detected,
   wherein a polarity inversion mode generated by the pixel voltage signal is a column inversion mode, so that pixel voltage signals for a same column of pixels in the liquid crystal panel have a same polarity, and a polarity change of the pixel voltage signal occurs once every at least one column of pixels in the liquid crystal panel to be detected.

2. The detection circuit as claimed in claim 1, wherein said column inversion mode is a single column inversion mode.

3. The detection circuit as claimed in claim 1, wherein said column inversion mode is a two columns inversion mode.

4. The detection circuit as claimed in claim 1, further comprising a control switch;
   said control switch is connected to a timing controller, the signal source and the source driver, and is used to control the connection between the signal source and the source driver or control the connection between the timing controller and the source driver, wherein said timing controller provides another polarity inversion signal which is a periodical square wave signal.

5. A detection method of detecting a damaged area of an orientation film in a liquid crystal display, comprising:
   providing a polarity inversion signal to the source driver by a signal source, wherein the polarity inversion signal comprises column polarity inversion signals each of which defines a polarity of pixel voltage signal for at least one column of pixels of the liquid crystal panel and is a continuous high level signal or a continuous low level signal;

performing a digital-analogue conversion by the source driver on received display data signal according to a preset reference voltage and the polarity inversion signal so as to generate a pixel voltage signal; and providing a row scan signal by a gate driver to a liquid crystal panel to be detected, wherein under the control of said row scan signal, the source driver sends the pixel voltage signal to the liquid crystal panel to be detected so as to load a gray picture to the liquid crystal panel to be detected, and determine whether there is the damaged area of the orientation film in the liquid crystal panel to be detected based on whether a prominent bright area exists in the gray picture loaded in the liquid crystal panel to be detected, wherein a polarity inversion mode formed by the pixel voltage signal is a column inversion mode, so that pixel voltage signals for a same column of pixels in the liquid crystal panel have a same polarity, and a polarity change of the pixel voltage signal occurs once every at least one column of pixels in the liquid crystal panel to be detected.

6. The method as claimed in claim 5, further comprising:
connecting the signal source and the source driver under control of a control switch, which is used to control the connection between the signal source and the source driver or control the connection between a timing controller and the source driver;
wherein said timing controller provides another polarity inversion signal which is a periodical square wave signal.

7. The method as claimed in claim 5, wherein the level of the gray picture is from 60 through 100.

8. The method as claimed in claim 5, wherein said column inversion mode is a single column inversion mode.

9. The method as claimed in claim 5, wherein said column inversion mode is a two columns inversion mode.

10. A detection method for detecting a damaged area of an orientation film in a liquid crystal display, comprising steps of:
providing a polarity inversion signal from a signal source to a source driver, wherein the polarity inversion signal includes column polarity inversion signals each of which defines a polarity of pixel voltage signal for at least one column of pixels of the liquid crystal panel and is a continuous high level signal or a continuous low level signal;

performing a digital-analogue conversion by the source driver on received display data signal according to a preset reference voltage and the polarity inversion signal provided from the signal source, so as to generate a pixel voltage signal;

providing a row scan signal from the gate driver to the liquid crystal panel to be detected, and sending the pixel voltage signal from the source driver to the liquid crystal panel to be detected, so as to load a gray picture to the liquid crystal panel to be detected; and determining whether there is the damaged area of the orientation film in the liquid crystal panel to be detected based on whether a prominent bright area exists in the gray picture loaded in the liquid crystal panel to be detected, wherein, a polarity inversion mode formed by the generated second pixel voltage signal is a column inversion mode, so that the second pixel voltage signals for a same column of pixels in the liquid crystal panel have a same polarity, and a polarity change of the second pixel voltage signal occurs once every at least one column of pixels in the liquid crystal panel to be detected.

11. The method as claimed in claim 10, further comprising:
providing another polarity inversion signal from a timing controller to the source driver, wherein the first polarity inversion signal is a periodical square wave signal; and
performing a digital-analogue conversion by a source driver on received display data signal according to the preset reference voltage and said another polarity inversion signal provided from the timing controller, so as to generate another pixel voltage signal.

12. The method as claimed in claim 11, further comprising:
connecting the signal source and the source driver or connecting the timing controller and the source driver under control of a control switch.

13. The method as claimed in claim 10, wherein the level of the gray picture is from 60 through 100.

14. The method as claimed in claim 10, wherein the polarity inversion mode formed by the generated first pixel voltage signal is a row inversion mode or a dot inversion mode.

15. The method as claimed in claim 10, wherein said column inversion mode is single column inversion mode or two columns inversion mode.

* * * * *